United States Patent
Gosling (10) Patent No.: US 8,328,131 B2
(45) Date of Patent: Dec. 11, 2012

(54) ANNULAR AIRBORNE VEHICLE

(75) Inventor: Harry George Dennis Gosling, Bristol (GB)

(73) Assignee: Go Science Limited, Bristol (GB)

( * ) Notice: Subject to any disclaimer, the term of this patent is extended or adjusted under 35 U.S.C. 154(b) by 0 days.

(21) Appl. No.: 13/466,343

(22) Filed: May 8, 2012

(65) Prior Publication Data

US 2012/0256043 A1    Oct. 11, 2012

Related U.S. Application Data

(62) Division of application No. 12/594,719, filed as application No. PCT/GB2008/001329 on Apr. 16, 2008, now Pat. No. 8,262,016.

(30) Foreign Application Priority Data

Apr. 18, 2007    (GB) .................................. 0707512.0

(51) Int. Cl.
    *B64C 39/06*    (2006.01)
(52) U.S. Cl. ..................... 244/34 A; 244/12.2; 244/12.6
(58) Field of Classification Search ................ 244/34 A, 244/12.6, 12.2, 45 R
    See application file for complete search history.

(56) References Cited

U.S. PATENT DOCUMENTS

| | | | |
|---|---|---|---|
| 2,510,959 A * | 6/1950 | Custer ............................ 244/12.6 |
| 2,907,536 A | 10/1959 | Zborowski | |
| 2,971,724 A * | 2/1961 | Von Zborowski ........... 244/12.1 |
| 3,000,593 A | 9/1961 | Gerhard et al. | |
| 3,017,139 A * | 1/1962 | Binder ........................... 244/12.6 |
| 3,198,459 A | 8/1965 | Geary | |
| 3,252,673 A | 5/1966 | Reichert | |
| 3,350,035 A * | 10/1967 | Schlieben ....................... 244/7 R |
| 3,437,290 A * | 4/1969 | Norman ........................ 244/12.2 |
| 3,572,603 A * | 3/1971 | Whiteman ..................... 242/547 |
| 3,834,654 A * | 9/1974 | Miranda .......................... 244/13 |
| 3,987,981 A * | 10/1976 | Kook ............................ 244/12.5 |
| 4,307,856 A | 12/1981 | Walker | |
| 4,560,358 A | 12/1985 | Adler | |
| 4,726,546 A * | 2/1988 | De Angelis .................. 244/12.6 |
| 4,804,155 A | 2/1989 | Strumbos | |
| 4,967,983 A | 11/1990 | Motts | |

(Continued)

FOREIGN PATENT DOCUMENTS

DE    19919626    11/2000

(Continued)

OTHER PUBLICATIONS

EP Search Report & Opinion issued Dec. 28, 2010, in related app. No. EP 10188051.6.

(Continued)

*Primary Examiner* — Christopher P Ellis
(74) *Attorney, Agent, or Firm* — Barnes & Thornburg LLP; Mark J. Nahnsen (57) ABSTRACT

An airborne vehicle having a wing-body which defines a wing-body axis and appears substantially annular when viewed along the wing-body axis, the interior of the annulus defining a duct which is open at both ends. A propulsion system is provided comprising one or more pairs of propulsion devices, each pair comprising a first propulsion device mounted to the wing-body and positioned on a first side of a plane including the wing-body axis, and a second propulsion device mounted to the wing-body and positioned on a second side of the plane including the wing-body axis.

16 Claims, 10 Drawing Sheets

U.S. PATENT DOCUMENTS

| | | | |
|---|---|---|---|
| 5,046,684 A | 9/1991 | Wolkovitch | |
| 5,082,206 A * | 1/1992 | Kutschenreuter et al. | .. 244/53 B |
| 5,115,996 A | 5/1992 | Moller | |
| 5,503,352 A | 4/1996 | Eger | |
| 5,595,358 A | 1/1997 | Demidov et al. | |
| 5,996,933 A | 12/1999 | Schier | |
| 6,079,398 A | 6/2000 | Grimm | |
| 6,170,778 B1 | 1/2001 | Cycon et al. | |
| 6,227,498 B1 | 5/2001 | Arata | |
| 6,270,038 B1 | 8/2001 | Cycon et al. | |
| 6,474,604 B1 | 11/2002 | Carlow | |
| 6,607,162 B2 | 8/2003 | Warsop et al. | |
| 6,691,949 B2 | 2/2004 | Plump et al. | |
| 6,793,172 B2 | 9/2004 | Liotta | |
| 6,817,571 B2 | 11/2004 | Retz et al. | |
| 6,845,941 B2 | 1/2005 | Pica | |
| 7,100,867 B2 | 9/2006 | Houck et al. | |
| 7,520,470 B2 | 4/2009 | Lucchesini et al. | |
| 7,988,088 B2 * | 8/2011 | Konstantinovskiy | ........ 244/12.6 |
| 2007/0170309 A1 | 7/2007 | Schafroth | |

FOREIGN PATENT DOCUMENTS

| | | |
|---|---|---|
| FR | 528041 | 11/1921 |
| FR | 1145863 | 10/1957 |
| FR | 1193847 | 11/1959 |
| FR | 2697794 | 5/1994 |
| GB | 795048 | 5/1958 |
| GB | 865524 | 4/1961 |
| GB | 2351271 | 12/2000 |
| WO | WO 94/00347 | 1/1994 |
| WO | WO 2004/065208 | 8/2004 |

OTHER PUBLICATIONS

Extended EP Search Report issued Feb. 28, 2011, in related app. No. EP10187803.1.

* cited by examiner

Figure 2c
Elevation
Section C-C

Figure 2d
Plan

Plan View
Figure 7c

ANNULAR AIRBORNE VEHICLE

CROSS REFERENCE TO RELATED APPLICATIONS

This application is a Divisional of copending U.S. application Ser. No. 12/594,719, filed Oct. 5, 2009, which is a U.S. nationalization under 35 U.S.C. §371 of International Application No. PCT/GB2008/001329, filed Apr. 16, 2008, which claims priority to United Kingdom application no. 0707512.0, filed Apr. 18, 2007. The disclosures set forth in the referenced applications are incorporated herein by reference in their entireties.

The present invention relates to an annular airborne vehicle—that is, a vehicle having an outer wing-body which defines a wing-body axis and appears substantially annular when viewed along the wing-body axis, the interior of the annulus defining a duct which is open at both ends.

It is well understood that aircraft should be designed for minimal drag and mass characteristics, while maximising lift and aeroelastic characteristics so that fundamental aircraft design parameters may be adapted to achieve specific goals including better lift to drag ratios, better fuel efficiency, longer endurance and higher payload capacities, for example.

These fundamental design goals remain true whether the aircraft might be a miniature unmanned air vehicle (UAV), or a glider, or a passenger aircraft, or indeed a large transport aircraft.

It is an objective in many UAV applications to provide means for short take off and landing (STOL) or vertical take off and landing (VTOL), so that devices may be deployed and recovered without difficulty when runways may not be available. It is also desirable for UAVs to include means to hover, where surveillance, localisation, or communications activities may be required with little or no aircraft motion relative to the ground. Under such scenarios it is also desirable that the UAV should be capable of transition into an efficient forward flight phase, and vice versa, so that vehicle endurance would not necessarily be compromised by flight inefficiencies during VTOL, STOL, or hover phases. Under some circumstances it is advantageous to deploy such UAVs not only from ground but also from aircraft which may already be in flight, or land vehicles which may themselves be in motion, and therefore such UAVs would require special capabilities in order to withstand the demanding conditions imposed by such deployment envelopes.

Large UAVs are used in high altitude, long endurance scenarios where reconnaissance, or surveillance or imaging or communications functions may be required in order to achieve mission goals. Under such scenarios the endurance characteristics of the UAV become more important than take off or landing aspects, where lift to drag ratios must be high, mass must be low, and strength to weight ratios must also be high. It follows from aerodynamic principles that induced drag may be minimised by increasing the aspect ratio (AR) of the wing, where:

$$AR = B^2/S$$

(B=span; S=projected planform area)
which produces long slender wings where maximal efficiency must be balanced with aeroelastic constraints where wing structures must also survive other stresses induced during severe weather or take off or landing. Therefore such UAVs require improved vehicle forms in order to deliver better performance in terms of endurance, or range, or fuel efficiency, or payload capacity.

Therefore it is an object of this invention to disclose a common annular air vehicle form that may be utilised efficiently across a variety of UAV applications including those based upon miniature, agile vehicles, and large high altitude long endurance vehicles, and gliders.

It is also another object of this invention to disclose a common annular air vehicle form that may be utilised efficiently across a variety of manned aircraft applications including those based upon glider, light transit, heavy transit and passenger aircraft.

A first aspect of the present invention provides an airborne vehicle having a wing-body which defines a wing-body axis and appears substantially annular when viewed along the wing-body axis, the interior of the annulus defining a duct which is open at both ends; and a propulsion system comprising one or more pairs of propulsion devices, each pair comprising a first propulsion device mounted to the wing-body and positioned on a first side of a plane including the wing-body axis, and a second propulsion device which is mounted to the wing-body, positioned on a second side of the plane including the wing-body axis, and operable independently of the first propulsion device.

Preferably a direction of thrust of the first propulsion device can be adjusted independently of the direction of thrust of the second propulsion device, for instance by rotating the propulsion device. Alternatively each propulsion device comprises a thrust generator and a plurality of ducts arranged to receive propulsion gas from the thrust generator, and the direction of thrust of each propulsion device can be adjusted independently of the direction of thrust of the other propulsion device by adjusting the flow of propulsion gas in the ducts. In this case typically each duct is contained within the wing-body and at least some of the ducts have an inlet and an outlet in the wing-body.

In certain embodiments a thrust vector of each propulsion device can be adjusted between a first configuration in which the thrust vectors are co-directed and a second configuration in which the thrust vectors are contra-directed.

In one embodiment of the first aspect of the invention a magnitude of thrust of the first propulsion device can be adjusted independently of the magnitude of thrust of the second propulsion device, but not the direction of thrust.

Thus in general terms the propulsion devices are operable independently in the sense that either the direction of thrust of the first propulsion device can be adjusted independently of the direction of thrust of the second propulsion device; or a magnitude of thrust of the first propulsion device can be adjusted independently of the magnitude of thrust of the second propulsion device; or both.

Preferably a controller device is provided which is configured to independently operate the propulsion devices by issuing respective control signals to the propulsion devices.

A second aspect of the invention provides an airborne vehicle having a wing-body which defines a wing-body axis and appears substantially annular when viewed along the wing-body axis, the interior of the annulus defining a duct which is open at both ends, wherein the wing-body appears swept forward when viewed from a first viewing angle, and swept backward when viewed from a second viewing position at right angles to the first viewing angle.

In certain embodiments of the invention, the double-swept configuration of the second aspect of the invention provides several advantages:
  it enables the center of gravity of the annular vehicle to be more easily separated from its center of pressure, and therefore provides for better static and dynamic margins in pitch stability;

aeroelastic forces which would otherwise subject conventional planar forwardly swept wings to excessive tensile or flutter loads are effectively braced and dampened by the resilient annular structure of the wing-body;

the element of forward sweep makes the vehicle more tolerant of relatively high angles of attack, with lower susceptibility to stall, which is important when executing landings, take-off or other manoeuvres;

the element of forward sweep improves lift over drag ratios under some circumstances.

Preferably the wing-body has a leading edge with two or more noses, and a trailing edge with two or more tails which may be rotationally offset in relation to the noses (for instance by 90 degrees).

Typically at least part of the leading and/or trailing edge of the wing-body follows a substantially helical curve.

A third aspect of the invention provides an airborne vehicle having a wing-body which defines a wing-body axis and appears substantially annular when viewed along the wing-body axis, the interior of the annulus defining a duct which is open at both ends, wherein the wing-body carries at least one rudder on its left side and at least one rudder its right side.

In some embodiments the wing body carries two or more rudders on its left side and two or more rudders on its right side, and the wing-body is formed with a slot between each adjacent pair of rudders.

Preferably the wing-body has a projected planform area S, and a maximum outer diameter B normal to the wing-body axis, and wherein the ratio $B^2/S$ is greater than 0.5. The relatively large diameter wing-body enables an array of two or more sensors to be well spaced apart on the wing-body, providing a large sensor baseline. In this way the effective acuity of the sensor array increases in proportion to the length of the sensor baseline. Also, the relatively high ratio $B^2/S$ gives a high ratio of lift over drag, enabling the vehicle to be operated efficiently as a glider.

The duct may be fully closed along all or part of its length, or partially open with a slot running along its length. The duct may also include slots or ports to assist or modify its aerodynamic performance under certain performance conditions.

Various embodiments of the invention will now be described by way of example with reference to the accompanying drawings, in which:

FIG. 3b is a cross-section of the right-hand side of the fourth propelled vehicle taken along the wing-body axis and along a line D-D in FIG. 3a;

FIG. 4b is a cross-section of the right-hand side of the fifth propelled vehicle taken along the wing-body axis and along a line E-E in FIG. 4a;

FIG. 4c is a cross-section plan view of the fifth propelled vehicle taken along a line F-F in FIG. 4a;

FIG. 5b is a cross-section of the right-hand side of the sixth propelled vehicle taken along a line G-G in FIG. 5a;

FIG. 5c is a rear view of the vehicle of FIG. 5a;

FIG. 5d is an underside view of the vehicle of FIG. 5a;

FIG. 6b is a cross-section of the right-hand side of the glider taken along the wing-body axis and along a line H-H in FIG. 6a;

FIG. 7b is a side view of the vehicle of FIG. 7a; and

FIG. 7c is a plan view of the vehicle of FIG. 7a.

Figure 1A:
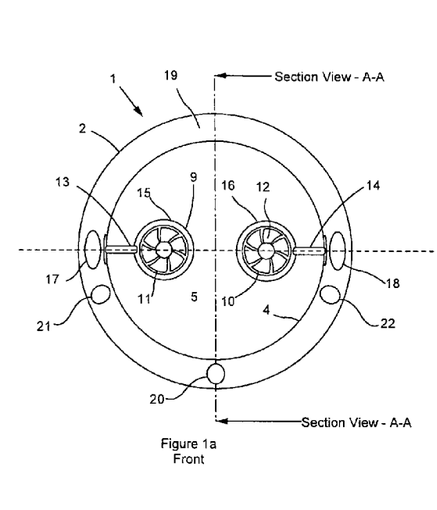
FIG. 1a is a front view of a first propelled vehicle.
Figure 1B:
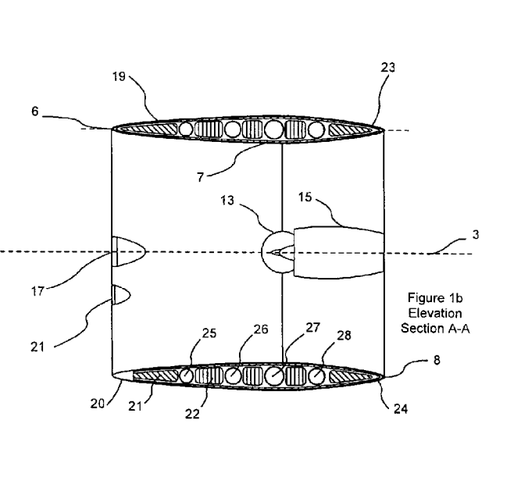
FIG. 1b is a cross-section of the right-hand side of the vehicle taken along the wing-body axis and along a line A-A in FIG. 1.

Referring to FIGS. 1a and 1b, an airborne vehicle 1 has an outer wing-body 2 which is evolved from a laminar flow aerofoil profile (shown in FIG. 1b) as a body of revolution around a wing-body axis 3. Thus the outer wing-body 2 appears annular when viewed along the wing-body axis as shown in FIG. 1a. An inner wall 4 of the annulus defines a duct 5 which is open fore and aft so that air flows through the duct as the vehicle moves through the air, generating aerodynamic lift by differential fluid flow across upper and lower aerofoil surfaces, which in this example arises whenever the axis of the annulus maintains an angle of incidence to its trajectory.

As shown in FIG. 1b, the aerofoil profile tapers outwardly gradually from a narrow nose end 6 to a widest point 7, then tapers inwardly more rapidly to a tail end 8. In this particular embodiment the widest point 7 is positioned approximately two-thirds of the distance between the nose and tail ends. The particular aerofoil section as described has symmetrical upper and lower surfaces which in this example provides for low minimum drag under cruising conditions, and may be modified in variants of this and other vehicles so as to modify the coefficients of lift, drag and pitch moment to suit the particular mission envelope and associated fluid flow regime as determined by the relevant range of Reynolds numbers.

A pair of propulsors 9, 10 are mounted symmetrically on opposite sides of a vertical plane containing the wing-body axis 3. In this particular embodiment the propulsors are shown as ducted electric fan motors comprising propellers (or impellers) 11, 12 which are mounted on L-shaped support shafts 13, 14 which in turn are mounted to the wing-body in line with the widest point 7 as shown in FIG. 1b. The propellers are mounted within shrouds 15, 16 in such a way that their efficiency is increased within a proportion of the motor operating envelope. Each L-shaped shaft is pivotally mounted to the wing-body so that it can rotate independently of the other shaft by 360 degrees relative to the wing-body about an axis parallel to the pitch axis of the vehicle, thus providing thrust-vectored propulsion. Both the shroud and L-shaped shaft have an aerofoil section using a ratio between chord length and height similar to that described for the outer wing-body, where the optimal relationship between height and chord is once again determined by the relative fluid flow regime as described by the relevant Reynolds number for these elements. Thus for example the propulsors 9, 10 can be rotated between the co-directed configuration shown in FIGS. 1a and 1b, in which they provide a thrust force to propel the vehicle forward and along the wing-body axis, to a contra-directed configuration (not shown) in which they cause the vehicle to roll continuously around the wing-body axis.

The vehicle uses four independently operable motors (not shown) within its propulsion system: two brushless DC electric motors to drive the propellers, and two DC electric brushless motors to drive the L-shaped support shafts upon which the propeller motors are mounted, where a mechanical worm drive gear reduction mechanism is used to transfer drive and loads between the motor and the L-shaped shafts. Alternative motor types such as stepper motors may be used for the latter scheme, so long as operating loads are consistent with the rating of the motors. Similarly alternative motor types may be adopted for the propulsors, including internal combustion, gas turbine or solid propellant motors.

The thrust-vectored propulsors provide the means for motion along the wing-body axis, either forward or in reverse, and spin or roll around the wing-body axis, and pitch or yaw about the vehicle's centre of gravity (CofG), which in this embodiment is located below the wing-body axis, above the lower annulus section, within a vertical plane that contains the wing-body axis, and approximately at 15 to 23% of the chord length when measured from the nose. As described earlier it is clear that the two propulsors may be contra-directed in order to induce vehicle roll. The two propulsors may also be co-directed. For instance when both are directed down so that their thrust vectors lies above the CofG, then the vehicle will pitch nose down. Similarly when the two propulsors are directed up so that their thrust vector lies below the CofG, then the vehicle will pitch nose up. It is also clear that varying degrees of propulsor pitch in relation to the vehicle and each other may be used to achieve vehicle pitch, roll and yaw. Yaw may also be induced by differential thrust application when differential propeller revolution rates are adopted. Thus it can be seen that the vehicle is able to dive, turn, roll and climb under its own autonomous control, since the vehicle also includes a controller device that includes the means to measure linear accelerations in three orthogonal axes, and angular accelerations in three orthogonal axes, and processing methods to calculate the control demands that would be delivered to the propulsion system.

Thus the direction of thrust of the propulsor 9 can be adjusted by the controller device independently of the direction of thrust of the propulsor 10 by issuing control signals to the electric motors which drive the L-shaped support shafts. Also, the magnitude of thrust of the propulsor 9 can be adjusted by the controller device independently of the magnitude of thrust of the propulsor 10 by issuing control signals to the electric motors which drive the propellers.

The vehicle has a high degree of manoeuvrability, since its thrust vectored propulsion may be arranged for high turn rates under dynamic control. It is also clear that the vehicle has a high degree of stability. In the first instance when motion is along the axis of the wing-body then relatively high speeds may be achieved with contra-rotating propellers that cancel induced torque, while contra-directed propulsors provide for further roll stability. In the second instance when spin motion around the wing-body axis is induced, then angular momentum is increased and once again the stability of the vehicle is increased, where this may be measured as a reduction in vehicle attitude or position errors when subject to external forces.

A significant advantage offered by this propulsion system is the provision of effective attitude control at slow speeds, when alternative control surfaces would be much less effective. It follows therefore that large thrust vector demands may be used effectively at slow speeds, and during launch or recovery, or take off and landing, while low thrust vector demands would satisfy the majority of performance envelope demands when traveling at speed. Another significant advantage of this arrangement is the relative ease with which the vehicle may transition from launch to forward transit, or to hover, or VTOL/STOL, and vice versa. A further significant advantage of this arrangement is the low drag characteristic of the annular wing-body, which preferentially allows for high speed transit in normal forward flight.

The nose of the vehicle carries a pair of video cameras 17,18 for collision avoidance and imaging applications. The relatively large diameter of the wing-body enables the cameras to be well spaced apart, thus providing a long stereoscopic baseline that provides for accurate range estimation by measurement of parallax between objects located within both camera fields of view. An ultrasonic transmitter 20 and two receivers 21, 22 are provided for acoustic imaging and sensing. Again, the wide baseline is an advantage since localization accuracy will be improved by differential time of flight processing between the separated receivers. The outer wing-body 2 contains an interior space which can be seen in FIG. 1a. This outer wing-body is preferentially manufactured from a stiff composite material using glass or carbon fibre filaments laminated alternately between layers of epoxy resin. Alternatively a cheaper, less resilient wing-body may be moulded from a suitable hard polymer such as polyurethane or high density polyethylene. Under certain conditions where mass reduction is paramount then the outer wing-body skin may be formed instead from a tough polymer film such as mylar. It is also possible to manufacture the outer wing-body from aluminium, should the wing-body be pressurised. The interior space may be pressurized, and houses a pair of battery packs 21, 22, a pair of tail sensors 23, 24, and four toroidal vessels 25-28 spaced apart along the wing-body axis. The vessels may contain the vehicle electronics, some propulsion subsystem elements and other items, and are joined by axial or tri-lateral struts (not shown) which would share the construction methods adopted for the toroidal vessels. In this particular embodiment the toroidal vessels are preferentially manufactured from stiff composites using either glass or carbon fibre filaments wound helically around the toroid and alternately laminated between layers of epoxy resin. Alternatively the toroidal vessels may be manufactured from a suitable grade of metal such as aluminium, stainless or galvanized steel, or titanium. The toroidal and annular structures disclosed herein are designed to provide for superior aeroelastic resilience around the wing-body so that mass may effectively and safely be reduced without risk of major stress loading or concentration at any section of the annulus.

The aspect ratio (AR) of the annular wing-body is defined as follows:

$$AR = 2B^2/S$$

where B is the span of the wing-body (defined by the maximum outer diameter of the wing-body) and where S is the projected planform area of the wing-body.

In the vehicle of FIG. 1a, the AR is approximately 2, although this number may be modified in other embodiments where the application may demand other ratios. It is evident that the vehicle form may be adjusted by simple variation of its toroidal diameter to reflect narrow vehicles where aspect ratio is low, or to reflect broad vehicles where aspect ratio is high. In either case specific advantages may be gained under certain circumstances, since relatively high coefficients of lift may be achieved using a toroidal form with low aspect ratio, while optimal glide slope ratios, or equivalent ratios of lift over drag may be achieved using a toroidal form with high aspect ratio.

Figure 1C:
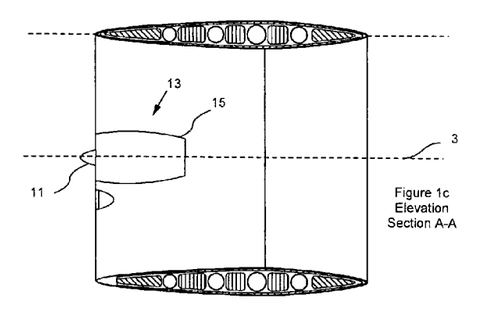
FIG. 1c is a cross-section of the right-hand side of a second propelled vehicle, where its propellers are located within the forward half of the duct.

In the embodiment of FIGS. 1a and 1b, the propulsion devices are mounted towards the tail of the vehicle—that is towards the right-hand side of FIG. 1b. In the second embodiment shown in FIG. 1c the propulsion devices are mounted towards the nose of the vehicle—that is towards the left-hand side of FIG. 1c. The front view of the vehicle of FIG. 1c is identical to that of the vehicle of FIG. 1b.

Figure 2A:
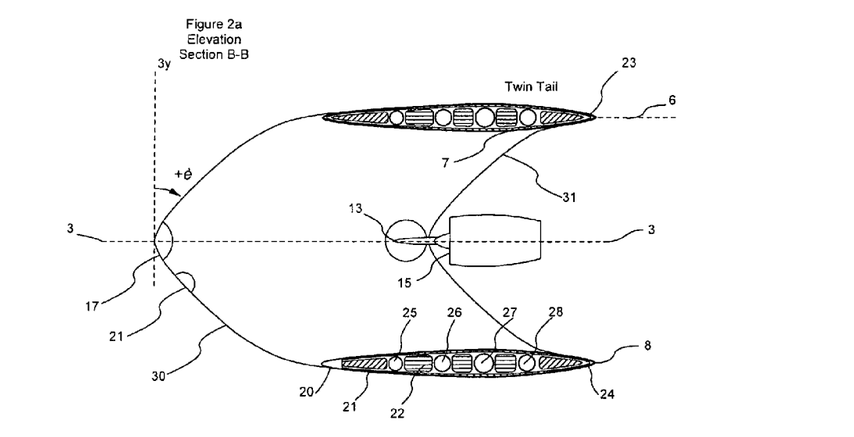
FIG. 2a is a cross-section of the right-hand side of a third propelled vehicle taken along the wing-body axis and along a line B-B in FIG. 2b, where its propellers are located within the rearward half of the duct.
Figure 2B:
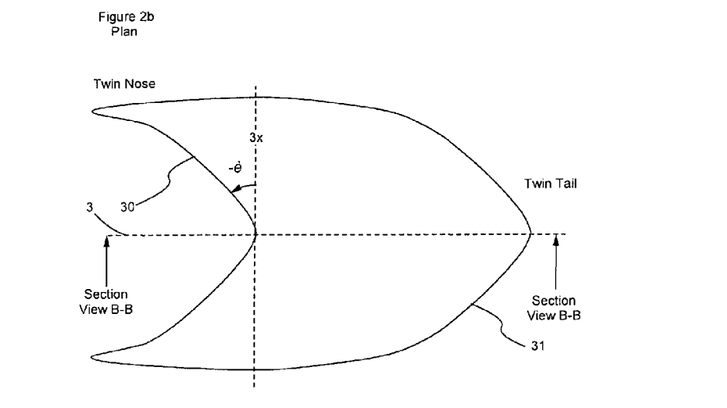
FIG. 2b is a plan view of the third propelled vehicle.

A swept-wing vehicle is shown in FIGS. 2a and 2b. The front view of the vehicle of FIGS. 2a and 2b is identical to that of the vehicle of FIG. 1b.

The leading edge 30 of the wing-body of the vehicle describes a form of helical curve around one quadrant of the circumference of the wing body, where such a helix subtends an angle +θ with a vertical line $3_y$ perpendicular to the wing-body axis 3, when viewed in elevation as shown in FIG. 2a. This helical curve is used identically around the third quadrant of the circumference of the wing-body leading edge, while its mirror image is used to form the second and third quadrants of the leading edge. The four helical elements are joined, so that the leading edge forms a closed double chevron sweep around the forward circumference of the wing-body. Within this particular embodiment, the trailing edge forms an identical closed double chevron sweep which is translated along the axis 3 by the chord length of the aerofoil. In other embodiments the relationship between the leading and trailing double chevron sweeps may be modified, for example to vary the relationship between orthogonal lift and rudder stabilization surfaces.

Similarly the trailing edge 31 of the wing-body of the vehicle subtends a positive angle (not labeled) with the line $3_y$. Thus, because the mid-chord line of the wing-body (that is, a line at the mid-point between the leading and trailing edges) subtends a positive angle with the line $3_y$ on both the upper and lower sides of the wing-body, the wing-body appears swept backward when viewed in elevation. In contrast, the leading edge 30 of the wing-body of the vehicle subtends an angle −θ with a horizontal line $3_x$ perpendicular to the wing-body axis 3, when viewed in plan as shown in FIG. 2b. Similarly the trailing edge 31 of the wing-body of the vehicle subtends a negative angle (not labeled) with the line 3. Thus, because the mid-chord line of the wing-body (that is, a line at the mid-point between the leading and trailing edges) subtends a negative angle with the line $3_x$ on both the left and right-hand sides of the wing body, the wing-body appears swept forward when viewed in plan. The sweep angle δ is described in FIG. 7c (and also labelled with numeral 69) under an alternative embodiment and may vary between 0 to 60°, and 0 to −60°, where δ is defined as the angle subtended by the helix $H_{xy}$ (i.e, the mid-chord line of the wing-body) and any plane which lies normal to the axis of the annular wing-body, and where $H_{xy}$ is transcribed by the mid-chord line around the annular wing-body, and where δ is constrained by the axial displacement t1 between the two chords whose tangential planes are vertical (i.e, left and right sides) in relation to the chords whose tangential planes are horizontal (i.e top and bottom sections). In this example and other embodiments the mean value of δ may be determined within each of four quadrants bounded by two orthogonal planes that coincide with the wing body axis 3, at which boundaries δ becomes zero. The axial displacement t1 is greater than or equal to 0.1 times the chord of the annulus. These relationships are described again in FIG. 7c.

In the embodiment of FIGS. 2a and 2b, the propulsion devices are mounted towards the tail of the vehicle—that is towards the right-hand side of FIGS. 2a and 2b. In the embodiment shown in FIGS. 2c and 2d, the propulsion devices are mounted towards the nose of the vehicle—that is towards the left-hand side of FIGS. 2c and 2d. The front view of the vehicle of FIGS. 2c and 2d is identical to that of the vehicle of FIG. 1b.

Figure 2C:
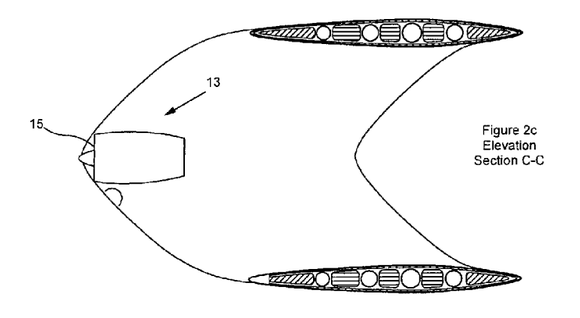
FIG. 2c is a cross-section of the right-hand side of a fourth propelled vehicle taken along the wing-body axis and along a line C-C in FIG. 2d, where its propellers are located within the forward half of the duct.
Figure 2D:
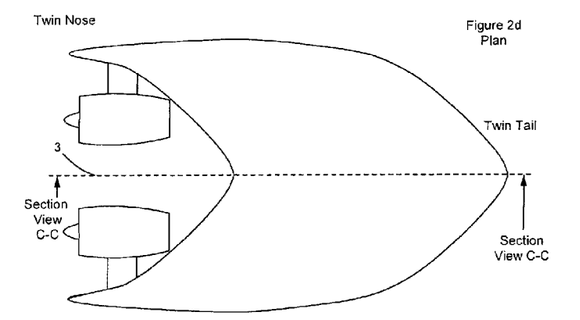
FIG. 2d is a plan view of the fourth propelled vehicle.
Figure 3A:
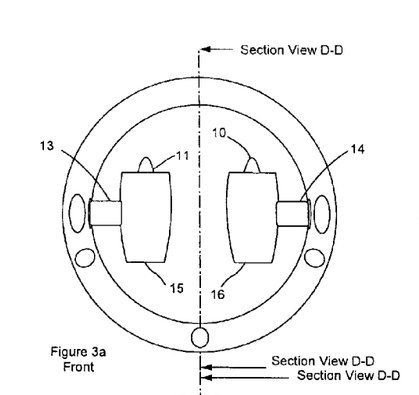
FIG. 3a is a front view of the fourth propelled vehicle with its propellers in an up thrust configuration.
Figure 3B:
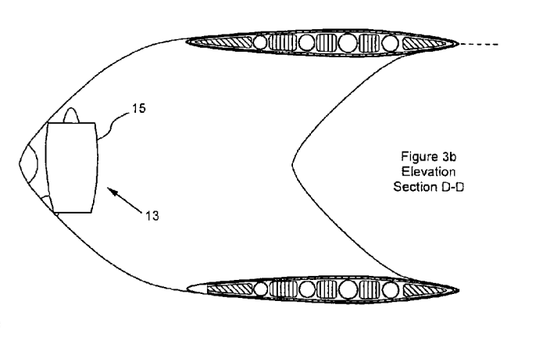
Figure 3C:
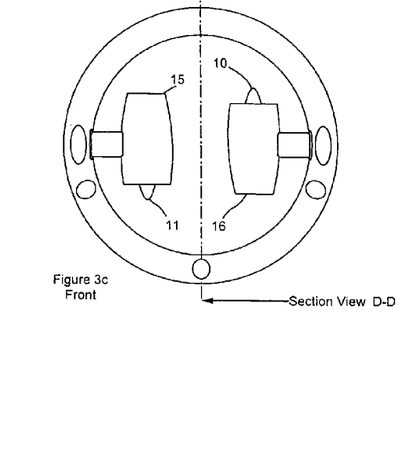
FIG. 3c is a front view of the fourth propelled vehicle with its propellers in a contra-directed spin thrust configuration.
Figure 3D:
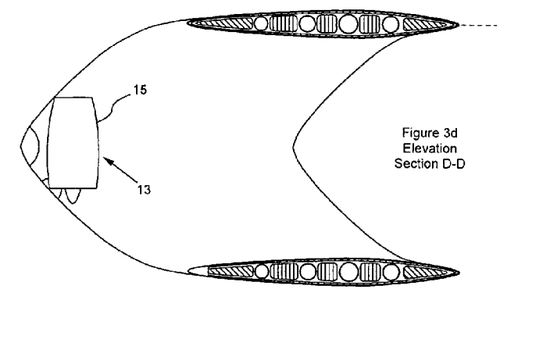
FIG. 3d is a cross-section of the right-hand side of the fourth propelled vehicle taken along the wing-body axis and along a line D-D in FIG. 3c.

FIGS. 3a and 3b illustrate the vehicle of FIGS. 2c and 2d with its propellers in an up thrust configuration, and FIGS. 3c and 3d illustrate the vehicle of FIGS. 2c and 2d with its propellers in a contra-directed spin thrust configuration.

Figure 4A:
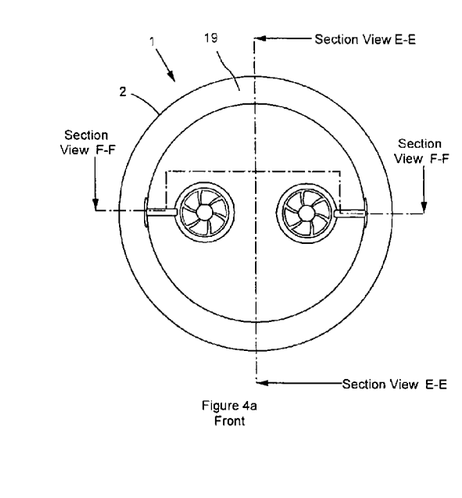
FIG. 4a is a front view of a fifth propelled vehicle with its propellers in a forward thrust configuration and located behind the rearward half of the duct.
Figure 4B:
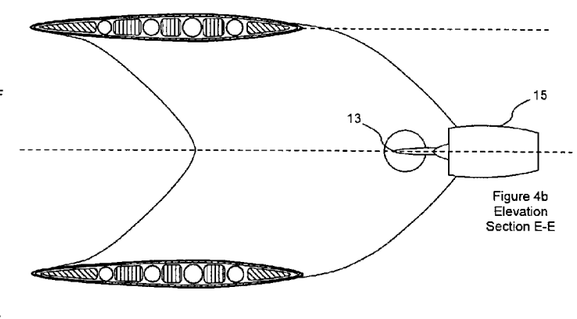
Figure 4C:
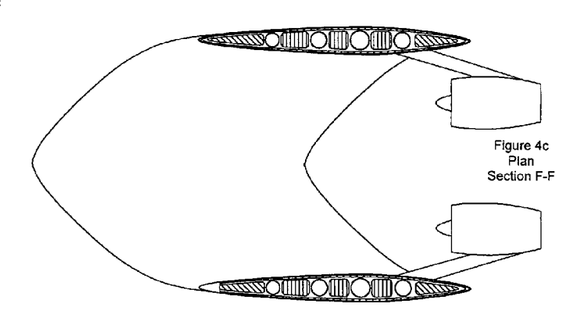

FIGS. 4a-4c show a variant of the vehicle of FIGS. 2a and 2b. Whereas the wing-body in the vehicle of FIGS. 2a and 2b is swept forward when viewed in plan, the wing-body in FIGS. 4a-4c is swept backward when viewed in plan. In this configuration the static and dynamic pitch stability margins are reduced by comparison with the wing-body scheme described in FIG. 2, however the propulsors have greater degrees of freedom in thrust vector control with lower interference to lifting surface fluid flows. As a consequence this scheme offers further improvements in vehicle agility.

Figure 5A:
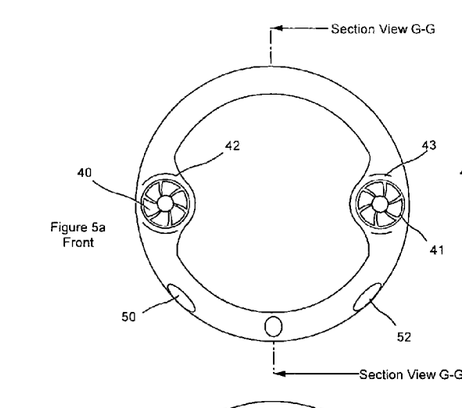
FIG. 5a is a front view of a sixth propelled vehicle with its propellers mounted conformally within the annular wing body.

FIG. 5a is a front view of a sixth propelled vehicle, employing a conformal propulsion system. A starboard propeller (or impeller) 40 is mounted in the inlet port 44 of a starboard main duct 42 which runs along the starboard side of the hull to a main outlet port 45, and a port propeller 41 (or impeller) is mounted in the inlet port of a port main duct 43 which runs along the port side of the hull to a main outlet port (not shown).

Figure 5B:
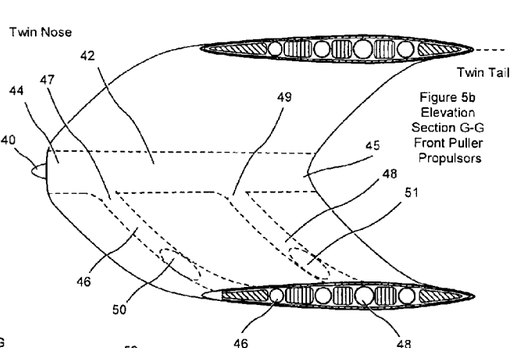
Figure 5C:
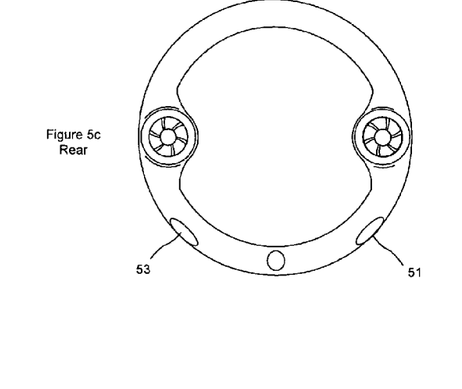
Figure 5D:
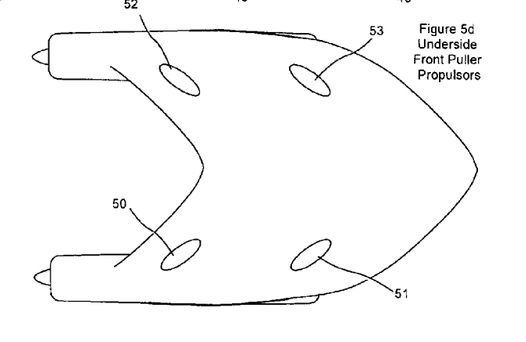

The ducting network of the propulsion system is symmetrical, so only the starboard elements will be described in detail with reference to FIG. 5b. The starboard main duct 42 is coupled to a forward duct 46 at an inlet 47, and to a rear duct 48 at an inlet 49. The forward duct 46 has port and starboard underside outlet ports 52, 50 in the underside of the hull, and the rear duct 48 has port and starboard underside outlet ports 53, 51 in the underside of the hull.

The port main duct 43 is also coupled to the ducts 46,48 via inlets (not shown) on the port side of the vehicle, similar to the inlets 47,49.

Note that all of the ducts described above are contained within the annular wing-body.

Valves (such as butterfly valves or sliding plate valves) are provided in the inlets 47, 49 (and the equivalent inlets on the port side of the vehicle), in the underside outlet ports 50-53, in the main outlet port 45 (and the equivalent main outlet port on the port side of the vehicle), and in the forward and rear ducts 46, 48 between the port and starboard underside outlet ports. The valves may be opened and closed digitally by pulse width modulation control.

The valves can be operated independently to adjust the flow of propulsion gas in the ducts, and thus adjust the magnitude and direction of the thrust generated by the port and starboard propulsion systems. For example forward thrust can be achieved by closing the valves in the inlets 47, 49 (and the equivalent inlets on the port side of the vehicle), and opening the valves in the port and starboard main outlet ports. VTOL, STOL, or hover phases can be achieved by closing (fully or partially) the valves in the port and starboard main outlet ports, and opening all other valves.

The underside outlet ports 50-53 are arranged to enclose a vertical axis that locates the centre of gravity (CofG) of the vehicle within a horizontal frame of reference. Therefore during VTOL, STOL or hover phases the propellers, motors, ducts, and valves may be controlled by a suitable device so that thrust may be adjusted between the four ports 50-53 in such a way that vehicle attitude and resultant vehicle accelerations and velocities may be precisely controlled. This controller device is described above for earlier variants of this annular wing-body. Once again the embodiment is particularly described with ducted electric fan motors, although these may be replaced by suitable alternative motors including internal combustion, gas turbine, or solid propellant motors.

Figure 6A:
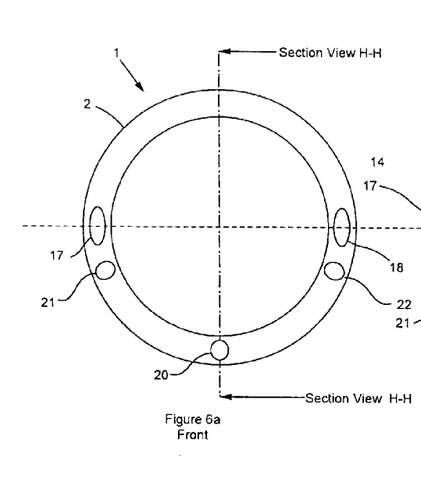
FIG. 6a is a front view of a glider.
Figure 6B:
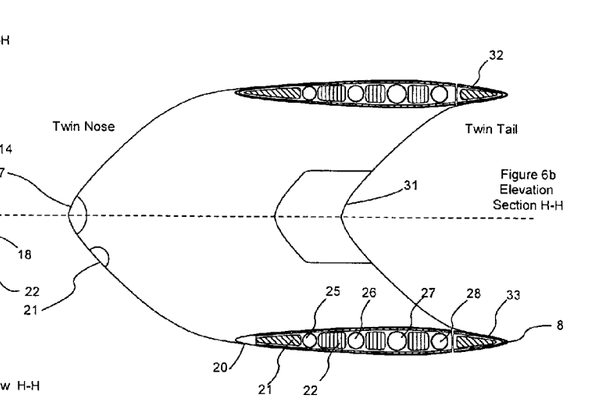
Figure 6C:
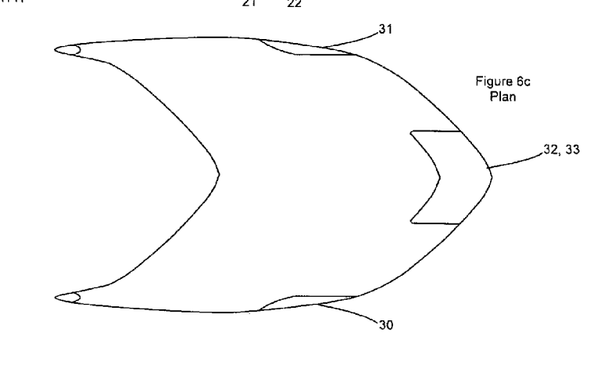
FIG. 6c is a plan view of the glider.

A glider vehicle is shown in FIGS. 6*a*-*c*. The wing-body of the vehicle has an annular construction as shown in FIG. 6*a*, and adopts a forwardly swept shape similar to the wing-body of FIGS. 2*a* and 2*b*. The wing-body uses similar construction, and houses various sensors, battery packs, and toroidal vessels in common with the vehicles shown in FIGS. 1-4.

Because the glider has no propulsion devices, it has a fully conformal outer shape with no superstructure either inside the duct or projecting from the exterior of the vehicle, other than its two elevators 32, 33 and two rudders 30, 31 which are conformally and orthogonally mounted around the rear of the wing-body. The elevators and rudders are secured to the wing-body by linkage mechanisms that provide for rotation within arcs of +/−30°. The elevators and rudders are controlled by worm drive mechanisms as disclosed for propulsor controls in FIGS. 1 to 5.

Figure 7A:
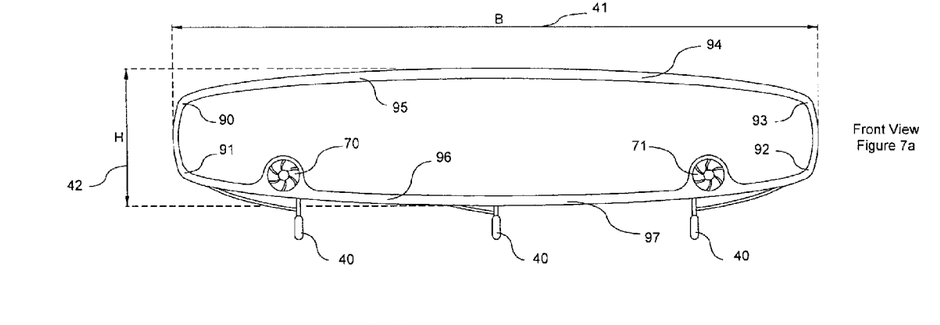
FIG. 7a is a front view of a seventh propelled vehicle.
Figure 7B:
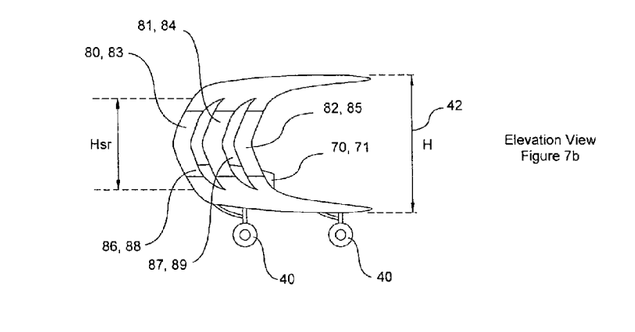
Figure 7C:
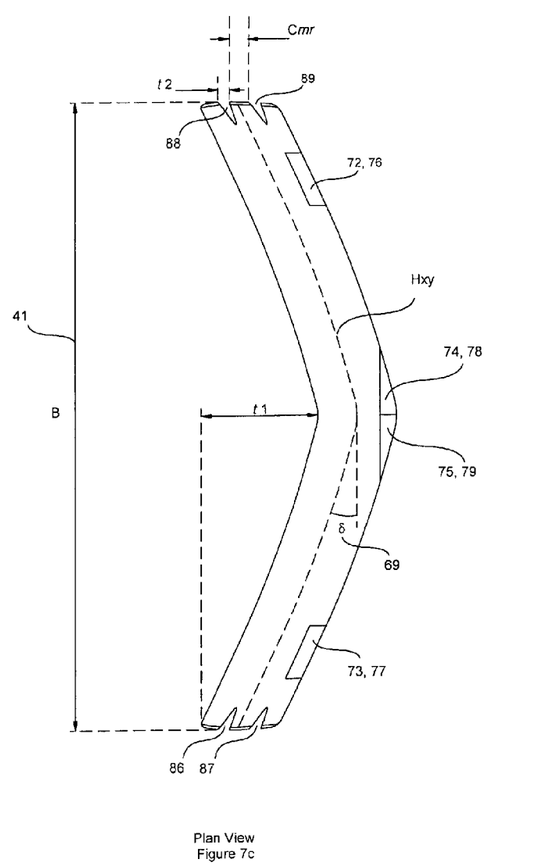

FIGS. 7*a*-7*c* show a propelled vehicle according to a further embodiment of the invention. As described for vehicles disclosed in FIGS. 2 to 6, this particular embodiment of the annular wing-body also includes wing sweep, and in particular a symmetrical double chevron sweep as explained for the vehicles described in FIG. 2, only in this embodiment the sweep angle δ 69 is approximately 21 degrees.

The vehicle has a twin propulsion system 70, 71 similar to that shown in FIGS. 2*a*/2*b* although in this particular embodiment the motors are mounted on the lower half of the annulus. Also, in contrast to the propulsion system of FIGS. 2*a*/2*b* (in which the direction and magnitude of thrust of each propulsion device can be adjusted independently of the direction and magnitude of thrust of the other propulsion device) vector control actuation elements are not included in the embodiment of FIGS. 7*a*-7*c* so in this case only the magnitude of thrust of each propulsion device can be adjusted independently of the magnitude of thrust of the other propulsion device, and not the direction of thrust (other than by switching between forward and reverse modes). Note also that in a further embodiment (not shown) the propulsion system of FIGS. 2*a*/2*b* may be fitted to the vehicle of FIGS. 7*a*-7*c*.

The position of the motors around the annulus may be adjusted symmetrically about the vertical plane that contains the wing-body axis, where absolute thrust vectors would need to be aligned to best fit the range of flight regimes intended. Elevators 74, 75 and ailerons 72, 73 are included on the upper cambered wing-body section, while elevators 78, 79 and ailerons 76, 77 are included on the lower cambered wing-body section, and rudders 80 to 82 are included on the left side of the wing-body, while rudders 83 to 85 are included on the right side of the wing-body. The form of this annular vehicle is particularly suited to large, high endurance platforms which seek to minimize mass and maximize operational efficiency and where agility concerns would not be so prevalent. Once again the annular wing-body form seeks to maximize a broad range of performance criteria including resilience to aeroelastic loading which become more dominant when aspect ratios become large.

In contrast with the circular annulus shown in FIG. 1*a*, the annulus is wider than it is tall, as shown in the front view of FIG. 7*a*. In this embodiment the relationship between span B and chord is 8 to 1, while span B to wing-body height H is 5 to 1. The aspect ratio of this embodiment is derived from:

$$AR=2B^2/S$$

Where AR=16

This particular aspect ratio is suited to long endurance operations where efficient soaring will be required.

The wing-body is arranged as four cambered sections 94 to 97 joined by four curved elements 90 to 93 that provide both for structural bracing and conformal housing of twin motors, fuel, batteries, undercarriage, control systems, stowage bays and payload items. The construction of the wing-body follows the methods and materials described for the earlier wing-bodies of FIGS. 1 to 6, where composite technologies would be used extensively within its structures. Similarly the motors may be based upon ducted electric fan, or internal combustion, or gas turbine technologies in either of push or pull configuration, augmented by hybrid energy sources including photovoltaic and fuel cell technologies.

The wing-body vehicle has three undercarriage elements 40 for providing stability during take-off and landing operations. Two elevator and two aileron elements 72 to 79 are included on each of the upper and lower sections of the annular wing-body, where the linkage mechanism that secures these elements is similar to that disclosed for the vehicle form described in FIG. 6*b*, while its control mechanism uses a worm drive as disclosed for vehicle forms disclosed in FIGS. 1 to 6. A plurality of rudder elements 80 to 85 are arranged at either vertical side of the annulus, using a linkage mechanism similar again to that described in FIG. 6*b*, and a control mechanism based again upon a worm drive as disclosed for vehicle forms described in FIGS. 1 to 6, together with flared slots 86 to 89 between each adjacent pair of rudders which provide for longitudinal separation $\tau_2$ between each rudder element where the ratio $S_r$ between the separation distance t2 and the mid-chord length of the rudder element $C_{mr}$ may vary between 0.5 and 5, such that:

$$S_r=t2/C_{mr}$$

and where the vertical height $H_{sr}$ subtended by the slots may vary between 0.3 and 0.8 times the height H of the annulus. Each rudder element incorporates an appropriate aerofoil to ensure smooth aerodynamic flow along their discrete surfaces, where the precise aerofoil shape would be similar to that adopted for the other sections of the annular wing body, with adjustments as might be necessary for the variation in Reynolds number associated with rudder chord reduction.

In this particular embodiment three rudder elements 80 to 82 and 83 to 85 are shown on each of left and right sides of the annular wing-body, and two flared slots 86, 87 and 88, 89 are also shown between the rudder elements on each of left and right sides. Each rudder houses a secure linkage that bonds with upper and lower wing-body sections to ensure structural integrity, and to allow for rotation within a prescribed are about a vertical axis, where the arc would normally be constrained to less than ±30°.

In this embodiment of the annular wing-body the combination of annulus, slots and multiple rudders serve to minimise induced drag, parasitic drag, mass and cross-flow effects for the whole of the annual wing-body vehicle while providing for stability and control in yaw. The double chevron sweep configuration also improves the soaring capability of the annular wing-body, where lift over drag ratios are increased by the effective forward sweep of upper and lower cambered lifting sections of the annular wing-body.

The high rotational symmetry of many of the wing-body shapes (as viewed along the wing-body axis) described herein gives other advantages where the vehicle is to be operated in a continuous or transient roll mode. However, the invention also covers alternative embodiments of the invention (not shown) including:

- embodiments in which the duct is divided into two or more separate ducts by suitable partitions
- embodiments in which the outer wing-body itself defines two or more separate ducts
- embodiments in which the outer wing-body is evolved from an aerofoil as a body of revolution around the wing-body axis by an angle less than 360 degrees. In this case, instead of being closed, the duct will be partially open with a slot running along its length. By making the angle greater than 180 degrees, and preferably close to 360 degrees, the wing-body will remain substantially annular so as to provide aerodynamic lift at any angle of roll.

The annular air vehicles described above achieve significant improvements in overall performance when measured across a broad range of whole vehicle criteria including lift to drag ratios, agility, stability, endurance, launch and recovery, take off or landing, power to weight ratios, fuel efficiency and resilience to aeroelastic loading.

The invention claimed is:

1. An airborne vehicle having a wing-body which defines a wing-body axis and appears substantially annular when viewed along the wing-body axis, the interior of the annulus defining a duct which is open at both ends, wherein the wing-body carries two or more rudders on its left side and two or more rudders on its right side and wherein the wing-body is formed with a slot between each adjacent pair of rudders.

2. The vehicle of claim 1 wherein the wing body carries three or more rudders on its left side and three or more rudders on its right side.

3. The vehicle of claim 1 wherein each slot is flared.

4. The vehicle of claim 1 wherein the wing-body has a projected planform area S, and a maximum outer diameter B normal to the wing-body axis, and wherein the ratio $B^2/S$ is greater than 0.5.

5. The vehicle of claim 1 further comprising three or more undercarriage elements for providing stability during take-off and landing operations.

6. The vehicle of claim 1 further comprising an energy source housed at least partially inside the wing-body.

7. The vehicle of claim 1 wherein each rudder houses a secure linkage that bonds with upper and lower sections of said wing-body to ensure structural integrity, and to allow for rotation within a prescribed arc about a vertical axis, where the arc is constrained to less than ±30°.

8. The vehicle of claim 1 wherein the wing-body has upper and lower sections, and wherein the vehicle further comprises two elevator elements and two aileron elements on each of the upper and lower sections.

9. The vehicle of claim 1 wherein the wing-body appears swept forward when viewed from a first viewing angle, and swept backward when viewed from a second viewing angle at right angles to the first viewing angle.

10. The vehicle of claim 9 wherein the wing-body appears swept forward when viewed in plan, and swept backward when viewed in elevation.

11. The vehicle of claim 9 wherein the wing-body has a leading edge with two or more noses, and a trailing edge with two or more tails.

12. The vehicle of claim 11 wherein the noses are rotationally offset in relation to the tails.

13. The vehicle of claim 9 wherein at least part of the leading and/or trailing edge of the wing-body follows a substantially helical curve.

14. The vehicle of claim 1 wherein the wing-body is evolved from an aerofoil profile as a body of revolution around the wing-body axis.

15. The vehicle of claim 14 wherein the aerofoil profile has symmetrical upper and lower surfaces.

16. The vehicle of claim 1 wherein the two or more rudders on its left side are spaced apart from each other in a fore-and-aft direction parallel with the wing-body axis, and wherein the two or more rudders on its right side are spaced apart from each other in the fore-and-aft direction parallel with the wing-body axis.

* * * * *